United States Patent [19]

Rijkaart

[11] Patent Number: 4,907,501
[45] Date of Patent: Mar. 13, 1990

[54] SYSTEM FOR FORMING A LAMINATE OF DOUGH AND FAT

[75] Inventor: Cornelis Rijkaart, Kortenhoef, Netherlands

[73] Assignee: Machinefabriek C. Rijkaart B.V., Netherlands

[21] Appl. No.: 299,703

[22] Filed: Jan. 23, 1989

[30] Foreign Application Priority Data

Jan. 26, 1988 [EP] European Pat. Off. ........... 88200126

[51] Int. Cl.$^4$ ........................ A21C 3/02; A21C 15/00; A23P 1/00
[52] U.S. Cl. .................... 99/450.1; 99/485; 425/96; 425/133.1; 426/502; 426/517
[58] Field of Search .................. 99/353, 450.1, 450.2, 99/349, 355, 460, 483, 485; 425/131.1, 96, 101, 329, 367, 373; 226/113, 119; 426/502, 516, 517

[56] References Cited

U.S. PATENT DOCUMENTS

| | | |
|---|---|---|
| 2,743,685 | 5/1956 | Hale et al. ............................ 99/450.2 |
| 2,746,401 | 5/1956 | Archer ................................. 425/96 |
| 3,804,637 | 4/1974 | Rejsa .................................. 99/450.1 |
| 4,421,776 | 12/1983 | Brinkers et al. ...................... 426/502 |
| 4,449,906 | 5/1984 | Sienkiewicz et al. ............. 425/131.1 |
| 4,626,188 | 12/1986 | Mortgenthaler et al. ........... 426/502 |
| 4,626,439 | 12/1986 | Meyer ................................. 426/517 |
| 4,770,619 | 9/1988 | Rijkaart .............................. 425/96 |

FOREIGN PATENT DOCUMENTS

| | | |
|---|---|---|
| 0239154 | 9/1987 | European Pat. Off. . |
| 0288120 | 10/1988 | European Pat. Off. ........... 99/450.1 |
| 1009124 | 7/1953 | Fed. Rep. of Germany . |
| 2559029 | 8/1985 | France . |
| 467027 | 6/1937 | United Kingdom . |

Primary Examiner—Timothy F. Simone
Attorney, Agent, or Firm—Kramer, Brufsky & Cifelli

[57] ABSTRACT

System for forming a laminate consisting of dough and fat, comprising in a single reducing station first and second reducing means which are each suitable for receiving a first and second ingoing layer consisting of dough and fat and for delivering a first and second outgoing layer, less thick than the respective ingoing layers, a laminating station which is suitable for receiving the first outgoing layer, and for partially placing on each other of parts of the first outgoing layer for forming and delivering the second outgoing layer, with a displacement direction opposite to the first outgoing layer, and comprising first to fourth conveyor means, being arranged essentially in one vertical plane and being suitable for conveying the layers thereon.

17 Claims, 5 Drawing Sheets

SYSTEM FOR FORMING A LAMINATE OF DOUGH AND FAT

BACKGROUND OF THE INVENTION

The invention relates to a system for forming a laminate consisting of dough and fat comprising first and second reducing means which are each suitable for receiving a first and second ingoing layer consisting of dough and fat and for delivering a first and second outgoing layer respectively being less thick than the respective ingoing layers, a laminating station which is suitable for receiving the first outgoing layer, and for partially placing on each other parts of the first outgoing layer for forming and delivering the second ingoing layer, first and second conveyor means for conveying the first ingoing layer and the first outgoing layer in the same directions of conveyance, and third and fourth conveyance means for conveying the second ingoing layer and the second outgoing layer in parallel directions of conveyance.

Such a system, which can be preceded by another laminating station, is known from the French patent application 2.559.029. In the known system the laminating station turns the layers received and delivered by it relative to each other through an angle of 90 degrees in the horizontal plane, such that the first and second layers are running at right angles to each other.

The known system has the disadvantage that it takes up a relatively large amount of floor space. This applies either where the further processing—such as cutting out, shaping and filling of dough products—of the laminate supplied by the system takes place in line therewith or by means of deflection elements at right angles thereto. Another disadvantage of the known system is that it contains two separate, expensive reducing stations containing the first and second reducing means respectively. Besides, each reducing station must be provided with a roller device having a roller driven so that it rotates at right angles to the layer to widen the ingoing layer and to compensate for any stresses possibly occuring in the lengthwise direction, and must also often be provided with a calibration roller for the thickness of the layer. The known system is therefore expensive for the user to purchase and in use.

SUMMARY OF THE INVENTION

The object of the invention is to eliminate the disadvantages of the known system.

This object is achieved according to the invention for the known system by that the first and second reducing means are disposed in a single reducing station, the laminating station is suitable for delivering the second ingoing layer in a direction of conveyance opposed to the first outgoing layer, and the conveyance means are arranged essentially in one vertical plane. In this way a processing line is obtained for shaping and further processing of a laminate consisting of dough and fat, which takes up relatively little space and comprises only one reducing station which is cheaper to produce, so that the purchase and running of the system are relatively cheap for the user.

BRIEF DESCRIPTION OF THE DRAWINGS

The invention will be explained with reference to the drawings, in which.

DETAILED DESCRIPTION OF THE PREFERRED EMBODIMENTS

Figure 1:
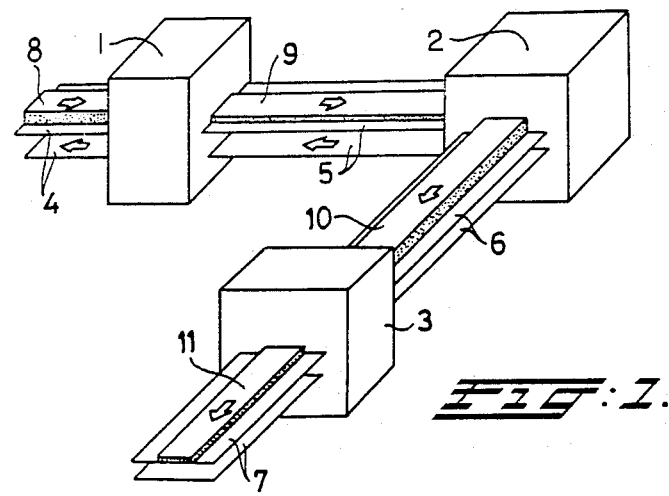
FIG. 1 shows schematically and in perspective a known system for forming a laminate consisting of dough and fat.
Figure 2:
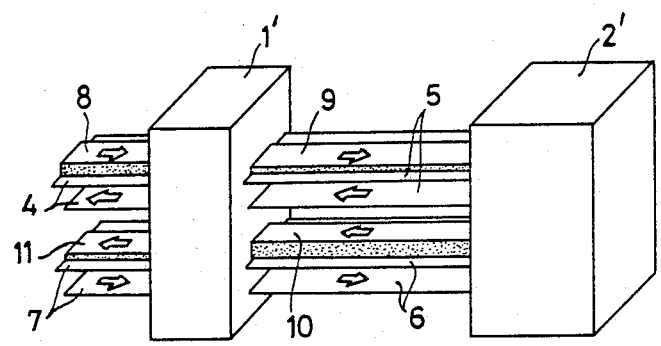
FIG. 2 shows schematically and in perspective a system according to the invention for forming a laminate consisting of dough and fat.
Figure 3:
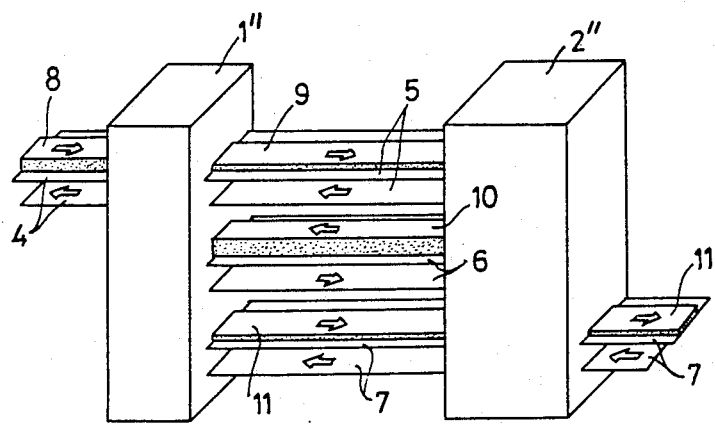
FIG. 3 shows schematically and in perspective another embodiment of the system according to the invention for forming a laminate consisting of dough and fat.

The known system shown in FIG. 1 for forming a laminate consisting of dough and fat comprises a first reducing station 1, a laminating station 2, a second reducing station 3, and first to fourth conveyer means, in particular conveyor belts, 4, 5, 6 and 7, going to and disposed between the stations 1, 2 and 3. In FIGS. 1 to 3 the directions of movements of the parts of the conveyor belts 4 to 7 are indicated by arrows on them.

The reducing station 1 receives via the conveyor belt 4, for example from another laminating station not shown, a first ingoing layer 8 made up of partial layers of dough and fat, and delivers onto the conveyor belt 5 a first outgoing layer 9 which is less thick than the first ingoing layer 8. The laminating station 2 deposits cut or folded parts of the first outgoing layer 9 on each other and on the conveyor belt 6 for the formation of a second ingoing layer 10 which is received by the second reducing station 3. The second reducing station 3 delivers onto the conveyor belt 7 a second outgoing layer 11 as having a smaller thickness than of the second ingoing layer 10. As can be seen from FIG. 1, the laminating station 2 works in such a way that the conveyor belts 4 and 5 run at right angles to the conveyor belts 6 and 7, so that the system takes up a relatively large amount of floor space.

The systems according to the invention shown in FIGS. 2 and 3 comprise a single reducing station 1', 1'', with dual function, to which the parallel-running conveyor belts 4 to 7 for receiving and delivering the layers 8 to 11 lead.

Figure 4:
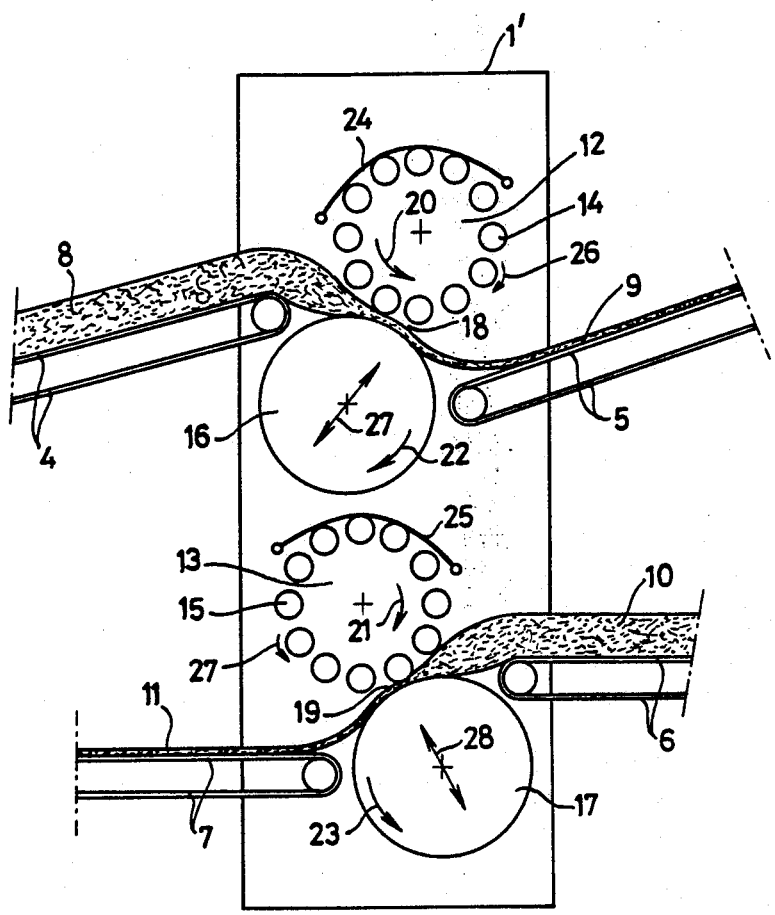
FIG. 4 shows a side view of a reducing station with dual function which is suitable for use in the system shown in FIG. 2.
Figure 5:
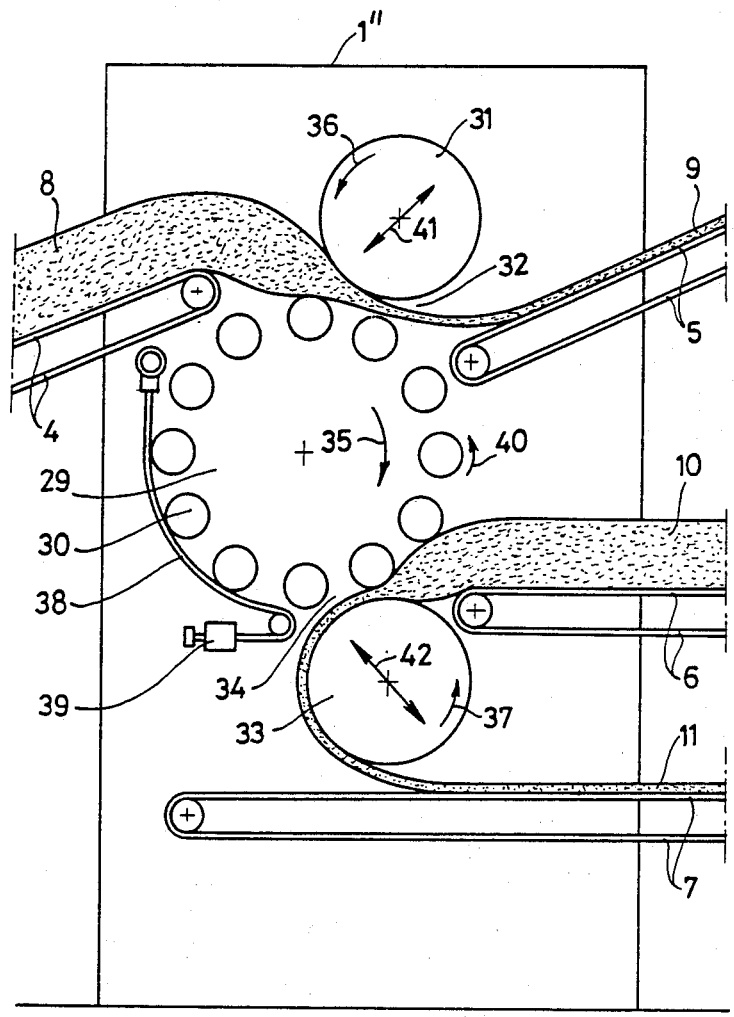
FIG. 5 shows a side view of another reducing station with dual function which is suitable for use in the system shown in FIG. 3.

FIG. 4 shows schematically a side view of an embodiment of the reducing station 1', and FIG. 5 shows in side view schematically an embodiment of the reducing station 1''.

Figure 6:
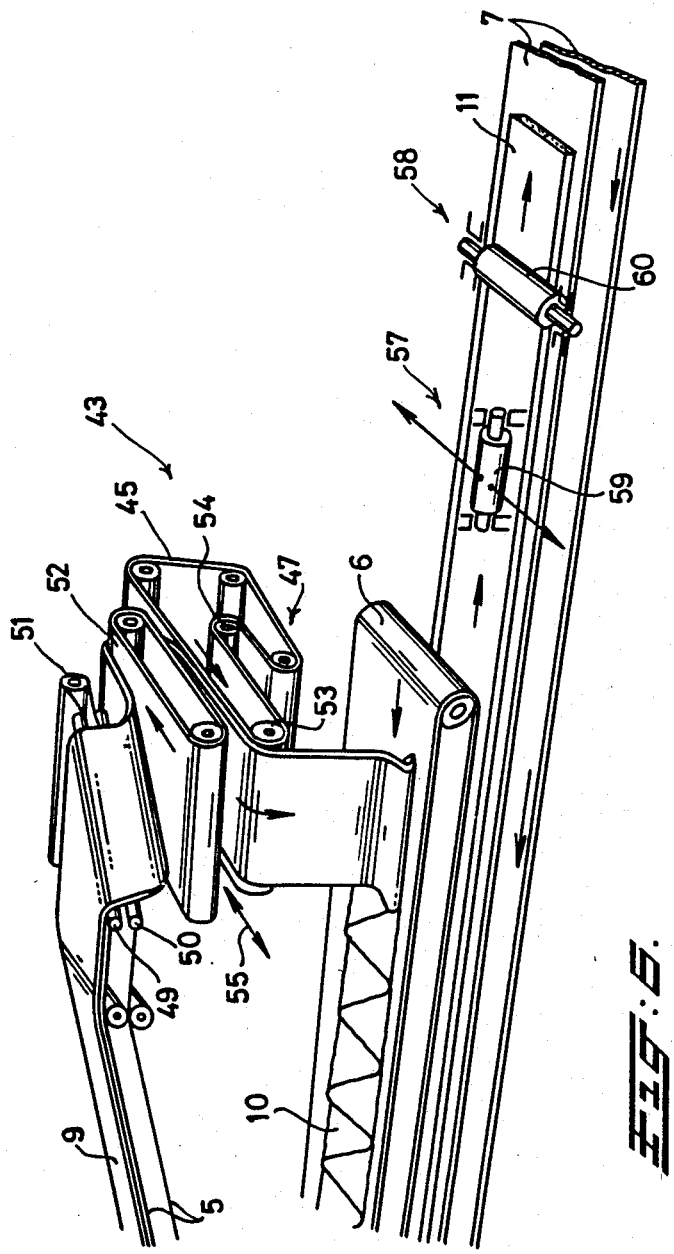
FIG. 6 shows perspective a laminating station which is suitable for use in the system shown in FIGS. 2 and 3.
Figure 7:
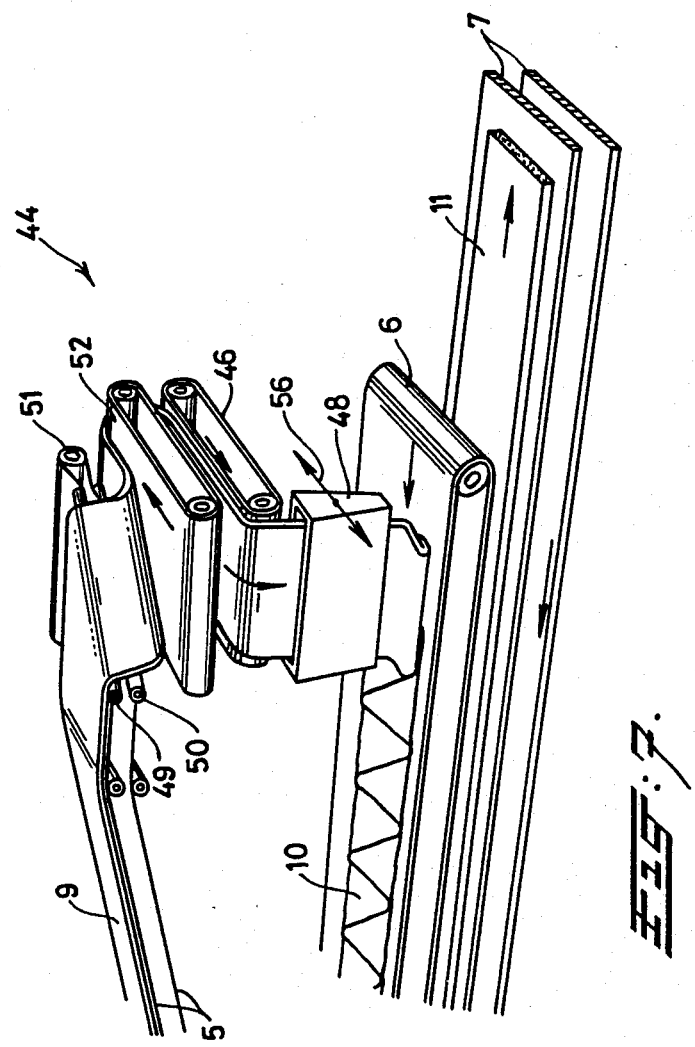
FIG. 7 shows another embodiment of a laminating station which is suitable for use in the system shown in FIGS. 2 and 3.

The systems according to FIGS. 2 and 3 comprise a laminating station 2', of which two different embodiments are shown schematically in perspective in FIGS. 6 and 7. In the system according to FIG. 3 the conveyor belt 7 runs without interruption through the laminating station 2', and the second outgoing layer 11 situated thereon is not processed in the laminating station 2'.

The first and second reducing means for reducing the thickness of the first and second ingoing layers 8, 10 to the first and second outgoing layers 9, 11 can each be formed by a pair of driven reduction elements disposed opposite each other and rotating in opposite directions about a horizontal axis, at least one reduction element of each pair being a roller-type roll with rollers supported on the periphery, thereof and rotating about a horizontal axis, in such a way that there is a passage between the reduction elements of each pair for receiving therein the ingoing layer of the pair and delivering therefrom the outgoing layer of the pair. Such a pair of reduction elements is known from Dutch Patent Applications 7,714,214 and 8,304,377 in the name of Applicant.

FIG. 4 shows an embodiment of the reducing station 1' in which a first pair of reducing elements receiving the first ingoing layer 8 and a second pair of reducing elements receiving the second ingoing layer 10 are formed by a roller-type roll 12, 13 having disposed on the circumference thereof rollers 14, 15, and a plain roll 16, 17 disposed below the roller-type roll 12, 13 and forming a passage 18, 19 with the roller-type roll 12, 13. The roller-type rolls 12, 13, 16 and 17 are driven by means of drive means not shown, so that they rotate in the direction of the arrows 20, 21, 22 and 23 respectively. The rollers 14, 15 are caused to rotate in the direction shown by arrows 26, 27 by means of a friction belt 24, 25 during rotation of the roller-type rolls 12, 13. The speeds of rotation of the roller-type rolls 12, 13 are so great that the peripheral speeds of the rollers 14, 15 are equal to the speed of the particular dough layer in the passage 18, 19, so that the respective layer is reduced in thickness by the rollers 14, 15, in the same way as a sheet of dough is reduced by rolling with a rolling pin by hand. The plain rolls 16, 17 can be moved in the directions indicated by the arrows 27, 28 in order to obtain a desired thickness of the first and second outgoing layers 9, 11.

It is pointed out that in the reducing station 1' the reduction elements of each pair 12, 16 and 13, 17 are interchangeable, each reduction element can be formed by a roll with rollers, and an endless belt such as that known from Dutch Patent Application 7,714,214 can be used instead of a plain roll.

FIG. 5 shows another embodiment of a reducing station 1" of the preferred system according to the invention shown in FIG. 3. The reducing station 1" comprised a single roller-type roll 29 with rollers 30 disposed on the periphery thereof, a top plain roll 31 which with the roller-type roll 29 forms a passage 32, and a bottom plain roll 33 which with the roll 29 forms a passage 34. The rolls 29, 31, 33 are rotatably driven by drive means not shown in the directions shown by the arrows 35, 36 and 37 respectively. The rollers 30 are caused to rotate during the rotation of the roller-type roll 35 in the direction indicated by the arrow 40 by means of a friction belt 38 guided over a number of rollers 30, the pressure of which against the rollers 30 can be set by means of a setting element 39. The roller-type rolls 31, 33 can be moved in the directions indicated by the arrows 41, 42, so that the thickness of the first and second outgoing layers 9, 11 can be set. As regards the speed of rotation of the roller-type roll 29, the same applies as for the roller-type rolls 12 and 13 of the reducing station 1' of FIG. 4.

In the reducing station 1" the plain rolls 31, 33 can also be replaced by roller-type rolls, while the roller-type roll 29 could also be replaced by a plain roll, or the above-mentioned conveyor belts known from Dutch Patent Application 7,714,214 could be used for the plain rolls. The reducing station according to FIG. 5 has the great advantage compared with the reducing station according to FIG. 4 that one of the reducing elements, which in particular is an expensive roller-type roll, is used in common. The reducing station 1" is thereby simpler, more compact and cheaper than the reducing station 1'.

FIGS. 6 and 7 show two different embodiments of the laminating station 2' of the system shown in FIGS. 2 and 3, indicated by reference numbers 43 and 44 respectively. It is pointed out that for use of the stations 43, 44 with the system shown in FIG. 2 the conveyor belt 7 with the second outgoing layer 11 thereon is not present, but comes out of the reducing station 1' on the left in FIG. 2.

The two systems 43, 44 comprise a fifth conveyor means, in particular an endless conveyor belt 45, 46 and disposed at one discharge end thereof metering means 47, 48 which in embodiments of the system shown in FIG. 1 are known per se. In the known system the conveyor belts 45, 46 are, however, disposed in line with the second conveyor means 5 for receiving the first outgoing layer 9 on the conveyor belt 45, 46.

However, the laminating stations 43, 44 also contain deflecting means for deflecting the first outgoing layer 9 through an angle of 90 degrees in a horizontal plane. In the laminating stations 43, 44 shown the deflecting means are formed by a pair of belt deflecting rollers 49, 50 disposed above one another at an angle of 45 degrees with the conveyor belt 45, 46, and a reversing roller 51 disposed above the appropriate conveyor belt 45, 46 and having horizontal rotation shafts over which the conveyor belt 5 is guided, and a sixth conveyor means disposed between the rollers 49, 50 and 51 and the conveyor belt 45, 46, in particular a conveyor belt 52 which receives the first outgoing layer 9 deflected by means of the deflecting rollers 49, 50 and deposits it on the conveyor belt 45, 46. Such deflecting means are used to avoid damage to the first outgoing layer during the deflection.

The conveyor belts 5, 45, 46 and 52 move at the same conveyance speed.

A roller 53 and an intermediate reversing roller 54 for the conveyor belt 45 can be moved in the direction indicated by the arrow 55 over the width of the second ingoing layer 10. When the rollers 53, 54 have reached the furthest away position from the infeed end of the conveyor belt 45 they are returned quickly over the width of the layer 10 and are then again returned at half speed of the conveyor belt 45. In this way the dough sheet is folded from the conveyor belt 45 onto the conveyor belt 6.

The conveyor belt 46 of the laminating station 44 shown in FIG. 7 is guided around fixed rollers, and disposed at the discharge end thereof is a downward tapering funnel 48 with a rectangular passage running in the direction of conveyance of the conveyor belt 6, to allow through the layer discharged from the belt 46. The funnel 48 has on its top end hinge means (not shown) with a horizontal axis of rotation and is swung by means of drive means (not shown) in the direction indicated by the arrow 56, so that the layer discharge from the belt 46 is folded onto the belt 6.

Instead of the belts 45, 46 and metering means shown, other means can also be used for depositing on each other and on the conveyor belt 6 parts of the first outgoing layer 9. It is, for example, possible to cut off parts of the first outgoing layer 9 at the discharge end of a conveyor belt 5, 46 or 52 and then to deposit the cut-off parts partially overlapping onto a conveyor belt lying below.

As shown in FIG. 6, a transverse roller station 57 and a calibration station 58 are disposed along the conveyor belt 7. The station 57 comprises a roller 59 with a horizontal axis of rotation running parallel to the belt 7. The roller 59 is rotatably driven by means of driving means not shown and is moved over the width of the second outgoing layer 11 for widening of the layer and for compensation for any stresses possibly occuring in lamination.

The calibration station 58 comprises a roller 60 with a horizontal axis of rotation running at right angles to the belt 7. The roller 60 is rotatably driven by mean of driving means not shown for making the layer 11 precisely the desired thickness.

Stations such as 57 and 58 can also be used in other embodiments of the system according to the invention.

What is claimed is:

1. System for forming a laminate consisting of dough and fat, comprising first and second reducing means which are each suitable for receiving a first and second ingoing layer consisting of dough and fat and for delivering a first and second outgoing layer respectively being less thick than the respective ingoing layers, a laminating station which is suitable for receiving the first outgoing layer, and for partially placing on each other parts of the first outgoing layer for forming and delivering the second ingoing layer, first and second conveyer means for conveying the first ingoing layer and the first outgoing layer in the same directions of conveyance, and third and fourth conveyance means for conveying the second ingoing layer and the second outgoing layer in parallel directions of conveyance whereby the first and second reducing means are disposed in a single reducing station, the laminating station is suitable for delivering the second ingoing layer in a direction of conveyance opposed to the first outgoing layer, and the conveyance means are arranged essentially in one vertical plane.

2. System according to claim 1, whereby each of the first and second reducing means comprises a pair of rotatably driven reduction elements disposed opposite each other and rotating about a horizontal axis in opposing directions, at least one reduction element of each pair being a roller-type roll having supported on the periphery thereof rollers rotating about a horizontal axis, in such a way that there is a passage between the reduction elements of each pair for receiving therein the ingoing layer of the pair and delivering therefrom the outgoing layer of the pair, and the pairs have a reduction element in common.

3. System according to claim 2, whereby the common reduction element is a roller-type roll.

4. System according to claim 2, whereby the common reduction element is a plain roll.

5. System according to claim 2, whereby the height of the passage corresponding to the direction of the thickness of the particular layers can be set in one pair independently of that in the other pair.

6. System according to claim 2, whereby the speeds of rotation of the non-common reduction elements of the pairs can be set independently of each other and relative to the common reduction element.

7. System according to claim 2, whereby the reducing station is capable of deflecting the second outgoing layer in such a way that the conveyance directions of the second ingoing layer and the second outgoing layer are opposite.

8. System according to claim 7, whereby the reducing station is capable of guiding the second outgoing layer over about half the circumference of a non-common reducing element.

9. System according to claim 1, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

10. System according to claim 9, whereby the second conveyance means is an endless conveyer belt, the deflection means are formed by a pair of deflection rollers disposed above one another and forming an angle of 45 degrees with the fifth conveyance means, for deflecting the fifth conveyance means, and a reversing roller which is disposed above the particular fifth conveyance means and having horizontal axes of rotation, over which the second conveyance means is guided, and a sixth conveyance means disposed between the rollers and the fifth conveyance means, the conveyance direction of said sixth conveyance means being such that it deflects the first outgoing layer via the deflection rollers through 90 degrees and subsequently deposits in on the fifth conveyance means.

11. System according to claim 2, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

12. System according to claim 3, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the first conveyance means.

13. System according to claim 4, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

14. System according to claim 5, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

15. System according to claim 6, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

16. System according to claim 7, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

17. System according to claim 8, whereby the laminating station has a fifth conveyance means receiving the first outgoing layer, the conveyance direction of which conveyance means is at right angles to the conveyance direction of the second ingoing layer, and of which one discharge end ends above the third conveyance means for forming the second ingoing layer, by means of metering means, on the third conveyance means, and the laminating station is provided with deflection means which deflect the first outgoing layer through an angle of 90 degrees in a horizontal plane, and the deflection means deposit the deflected first outgoing layer onto the fifth conveyance means.

* * * * *

UNITED STATES PATENT AND TRADEMARK OFFICE
CERTIFICATE OF CORRECTION

PATENT NO. : 4,907,501
DATED : March 13, 1990
INVENTOR(S) : Cornelis Rijkaart

It is certified that error appears in the above-identified patent and that said Letters Patent is hereby corrected as shown below:

In Claim 10, column 6, line 21, "conveyer" should read -- conveyor --.

In Claim 10, column 6, line 25, "fifth" should read -- second --.

In Claim 10, column 6, line 33, "in" should read -- it --.

In Claim 12, column 6, line 60, "first" should read -- fifth --.

In Figure 3 of the drawings, please delete " 2" " and insert -- 2' -- in lieu thereof.

Signed and Sealed this

Ninth Day of April, 1991

Attest:

HARRY F. MANBECK, JR.

Attesting Officer

Commissioner of Patents and Trademarks